(No Model.)

A. B. KING.
HOOF PAD.

No. 339,304.  Patented Apr. 6, 1886.

WITNESSES
Ed. A. Newman.
Al. C. Newman.

INVENTOR
Albert B. King,
By his Attorneys
Baldwin, Hopkins & Peyton.

UNITED STATES PATENT OFFICE.

ALBERT B. KING, OF NORWICH, NEW YORK.

HOOF-PAD.

SPECIFICATION forming part of Letters Patent No. 339,304, dated April 6, 1886.

Application filed November 12, 1885. Serial No. 182,575. (No model.)

*To all whom it may concern:*

Be it known that I, ALBERT B. KING, of Norwich, Chenango county, New York, have invented certain new and useful Improvements in Hoof-Pads, of which the following is a specification.

It is essential to the healthy growth of a horse's hoof that it be supplied with a considerable amount of moisture in addition to that derived from the fluids of the body. When the horse is in pasture the moisture is supplied by contact with vegetation; but when in stable some artificial means must be employed. Various forms of hoof-pads have been used to supply the necessary moisture, some of which have been more or less beneficial. So far as I am aware, however, all hoof-pads heretofore used have been cumbersome articles, that envelop a considerable portion of the leg and hoof, bind it closely, and really act as sweat-boots, so as to produce a feverish condition of the hoof, and thus impair rather than promote the healthy growth. I seek to avoid this objection, and have devised a pad adapted to be placed on a horse's ankle just over the hoof, so as to allow the water that it contains to gradually descend by gravity to the point where it is needed—namely, to the point between the hair and hoof.

My improved pad is simple in construction, is light, and permits a free circulation of air.

Figure 1:
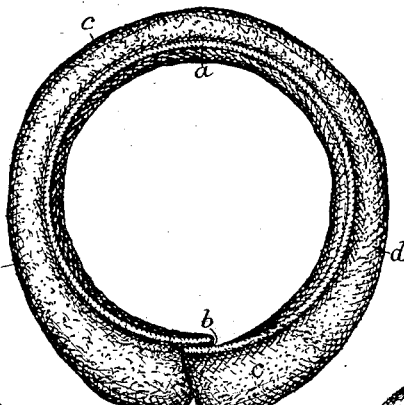
Figure 2:
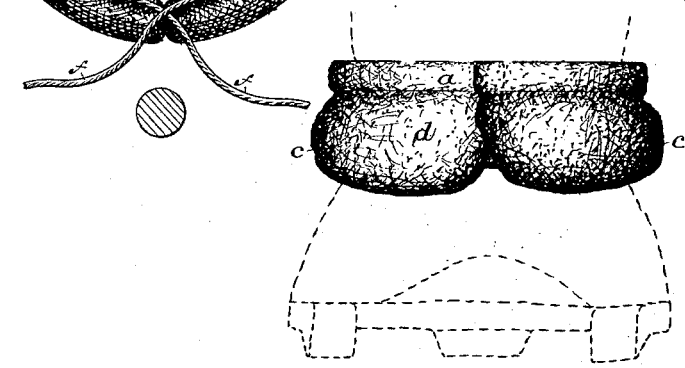

In the accompanying drawings, Figure 1 is a top view of one form of my improved pad; Fig. 2, a rear view of the same through the pad in position on a horse's ankle, and Figs. 3 and 4 show modifications.

In the pad shown in Figs. 1 and 2 I employ a spring-metal strap, $a$, open at $b$, and normally of a size sufficient to embrace a horse's leg or ankle just over the hoof. From the spring-strap $a$ is suspended a pad, $c$, composed of sponge or other light absorbent material inclosed in a sack of thin reticulated fabric, $d$. The fabric $d$ is preferably made to inclose the strap $a$ as well as the absorbent material $c$.

The pad, when saturated with water, may be applied to a hoof by simply forcing apart the ends of the spring-strap $a$ sufficiently to allow it to embrace the horse's leg just over the hoof.

Figure 3:
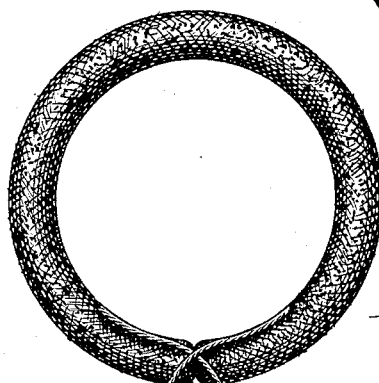
Figure 4:
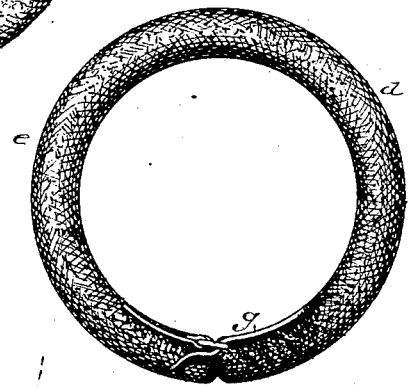

The simplest form of my improved pad is shown in Fig. 3. It consists of a body of absorbent material, $e$, preferably cylindrical in cross-section, as shown, of a sufficient length to encircle the ankle just over the hoof.

Any suitable device may be employed for uniting the ends of the pad. In this instance I employ two tie-cords, $f$. I may also employ a flexible strap, $g$, as shown in Fig. 4, from which the absorbent material is suspended.

The pad is arranged a little to one side of the strap, so that the inner side of the pad is tangential to the inner side of the strap. By this arrangement the pad rests lightly on the ankle and will not tend to bind it.

In both the pads shown in Figs. 3 and 4 there is only a small surface of contact with the foot, but water or moisture is supplied to the hoof in sufficient quantities to produce the desired effect.

I claim as my invention—

1. A hoof-pad composed of a strip or elongated narrow mass of absorbent material, in combination with a strap from which the absorbent material is freely suspended, so that the said pad, when in place, rests lightly around the crown of the hoof, substantially as described.

2. The combination, substantially as set forth, of the absorbent material, the strap, and the sack of reticulated fabric filled with absorbent material.

In testimony whereof I have hereunto subscribed my name.

ALBERT B. KING.

Witnesses:
 ALBA A. SKINNER,
 J. SKINNER.